June 9, 1953          J. T. KRAPP          2,641,490
COUPLING DEVICE WITH SPRING PRESSED TIGHTENERS
Filed Dec. 6, 1950                     2 Sheets-Sheet 1
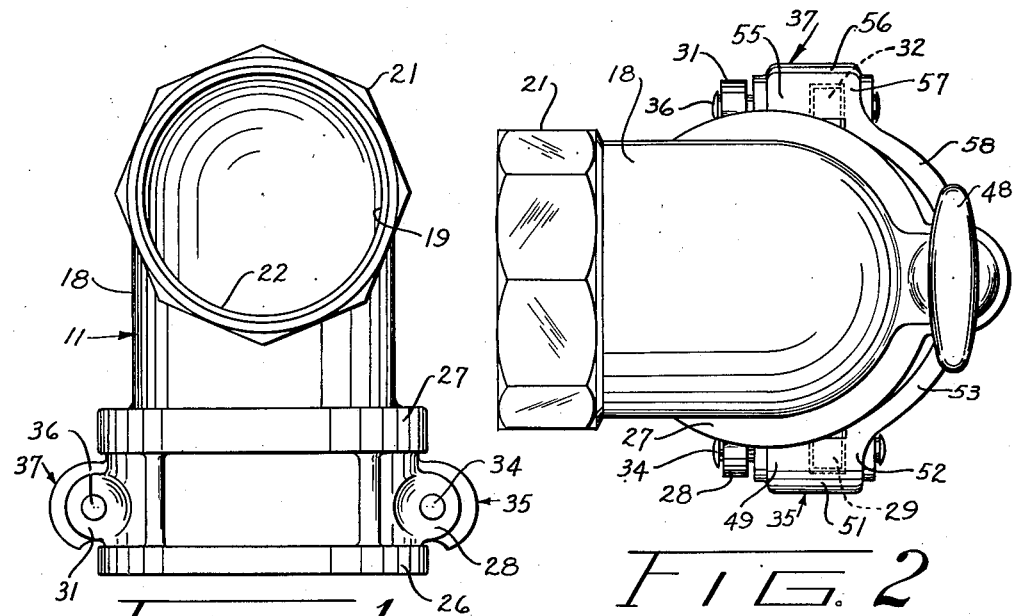
FIG. 1
FIG. 2
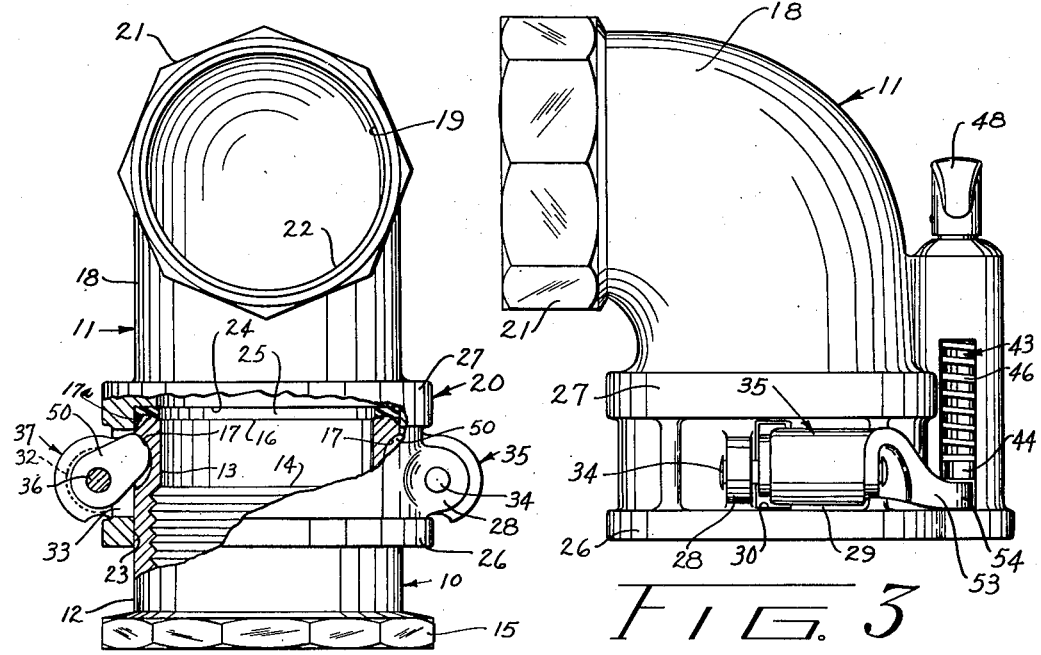
FIG. 4
FIG. 3
INVENTOR.
JOHN T. KRAPP
BY J. A. Grier
ATTORNEY June 9, 1953 J. T. KRAPP 2,641,490
COUPLING DEVICE WITH SPRING PRESSED TIGHTENERS
Filed Dec. 6, 1950 2 Sheets-Sheet 2
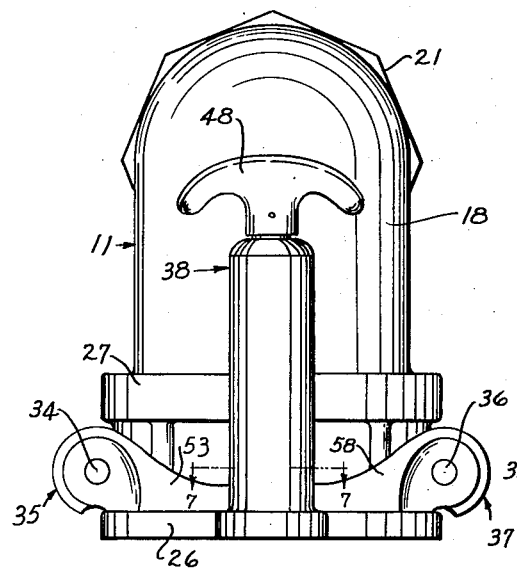
FIG. 5
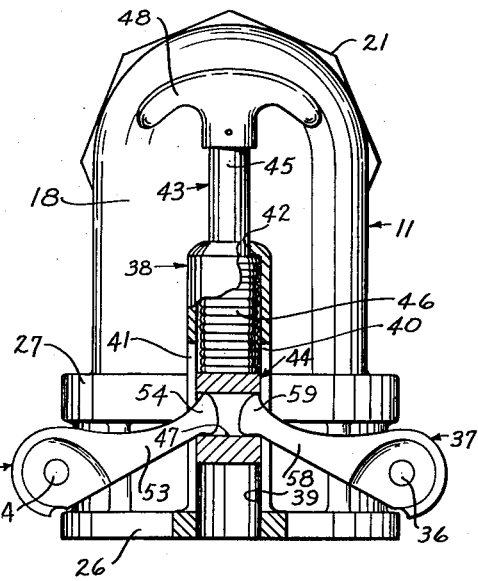
FIG. 6
FIG. 7
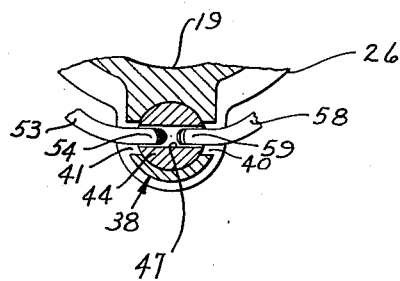
INVENTOR.
JOHN T. KRAPP
BY
ATTORNEY Patented June 9, 1953

2,641,490

UNITED STATES PATENT OFFICE 2,641,490

COUPLING DEVICE WITH SPRING PRESSED TIGHTENERS

John T. Krapp, Port Washington, N. Y.

Application December 6, 1950, Serial No. 199,433

8 Claims. (Cl. 285—171)

This invention relates to improvements in coupling devices with spring pressed tighteners for coupling conduits and the like and has for an object the provision of quickly attachable and detachable cooperative coupling members comprised of a male member having a seating face and an external annular groove thereon adjacent to said face, and a female or socket member having a seat therein supporting a gasket, to be engaged by said seating face, spaced apart cam means therein to engage said annular groove, and novel means for rotating said cam means in unison to force the seating face on said male member into tractile engagement with said seat with the gasket therebetween for effecting a fluid tight seal.

Another object of the invention is the provision on the female member of the coupling of a pair of oppositely disposed cams for engaging the annular groove on the male member, each cam being rotatably supported on said female member and having levers extending into a common actuator for moving said cams in unison.

A further object of the invention is the provision, in devices of the character described, of spring means on the common actuator constantly urging it in a direction to cause said cams to force the male member into sealing relation with the gasket and the gasket, in turn, with the seat in said female member.

Other objects and advantages of the invention will be apparent to those skilled in the art, upon a study of this specification and the accompanying drawings.

Referring to the drawings which illustrate one embodiment of the invention:

Figure 1 is an elevational view of the female member of my new and improved coupling;

Figure 2 is a view of the device of Figure 1 as seen from above;

Figure 3 is a side elevation as seen from the right side of Figure 1;

Figure 4 is an elevational view of the member of Figure 1 in cooperative relation with the male member, the female member being partially broken away to show the cam action, and the engagement of the gasket by both the seat in the female member and the seating face on the male member;

Figure 5 is a view as seen from the right side of Figure 3 and showing the levers, which operate the cams, in their engaged position;

Figure 6 is a view similar to Figure 5, except that the levers have been moved by the common actuator to their positions where the cams are disengaged from the male member; and Figure 7 is a view, partly in section, taken along the line 7—7 of Figure 5.

Referring to the drawings, the coupling is comprised of a male member 10 and a socket or female member 11.

The male member 10 has an annular wall portion 12 having an interior bore 13, the lower end of which may be provided with internal threads 14. The lower end of the member 10 is provided with a flange 15 which may be polygonal for convenience in screwing it onto the piping or other fitting. The opposite end of the tubular portion has formed thereon a seating face 16. Spaced apart from the seating face on the exterior of the tubular portion 12 is an annular groove 17 which is adapted to be engaged by cams to be presently described. Adjacent to the seating face on the exterior thereof is an annular beveled face 17a which cooperates with said cams.

The member 11 has an upper portion 18 which is shown in the form of an elbow (although it may be straight or any other shape desired), having interior passage 19 which extends from a socket portion 20 at the lower end thereof to a flange portion 21 thereof lying in a plane which is 90° with respect to the plane of the socket portion 20. This flange portion may also be polygonal in form and the passage 19 where it terminates in the flange portion 21 is provided with internal threads 22. The socket portion 20 has an interior bore 23 into which the tubular wall 12 freely fits. The bore 23 terminates in an annular undercut groove 24 into which an annular gasket 25 is portioned. The socket portion 20 has a flange 26 on its lower end, and spaced apart from this flange is a second flange 27. Extending upwardly from the flange 26 to the flange 27 are spaced lugs 28 and 29 with an open passage 30 therebetween, the purpose of which will presently be described.

Also extending between the flanges 26 and 27 are spaced lugs 31 and 32. The lugs 31 and 32 are oppositely distributed with respect to the lugs 28 and 29 and the lug 31 is in alignment with the lug 28 and the lug 32 is in alignment with the lug 29. Between the lugs 31 and 32 is a passage 33 communicating with the interior of the socket portion 20.

The bosses 28 and 29 have aligned holes therein through which a shaft 34 extends. Journalled on the shaft 34 is a cam lever member 35 which will presently be described in detail. The lugs 31 and 32 have aligned holes therein which carry a shaft 36 upon which is journalled a cam lever 37 which will also be described in detail.

Extending upwardly from the flange 26 is a

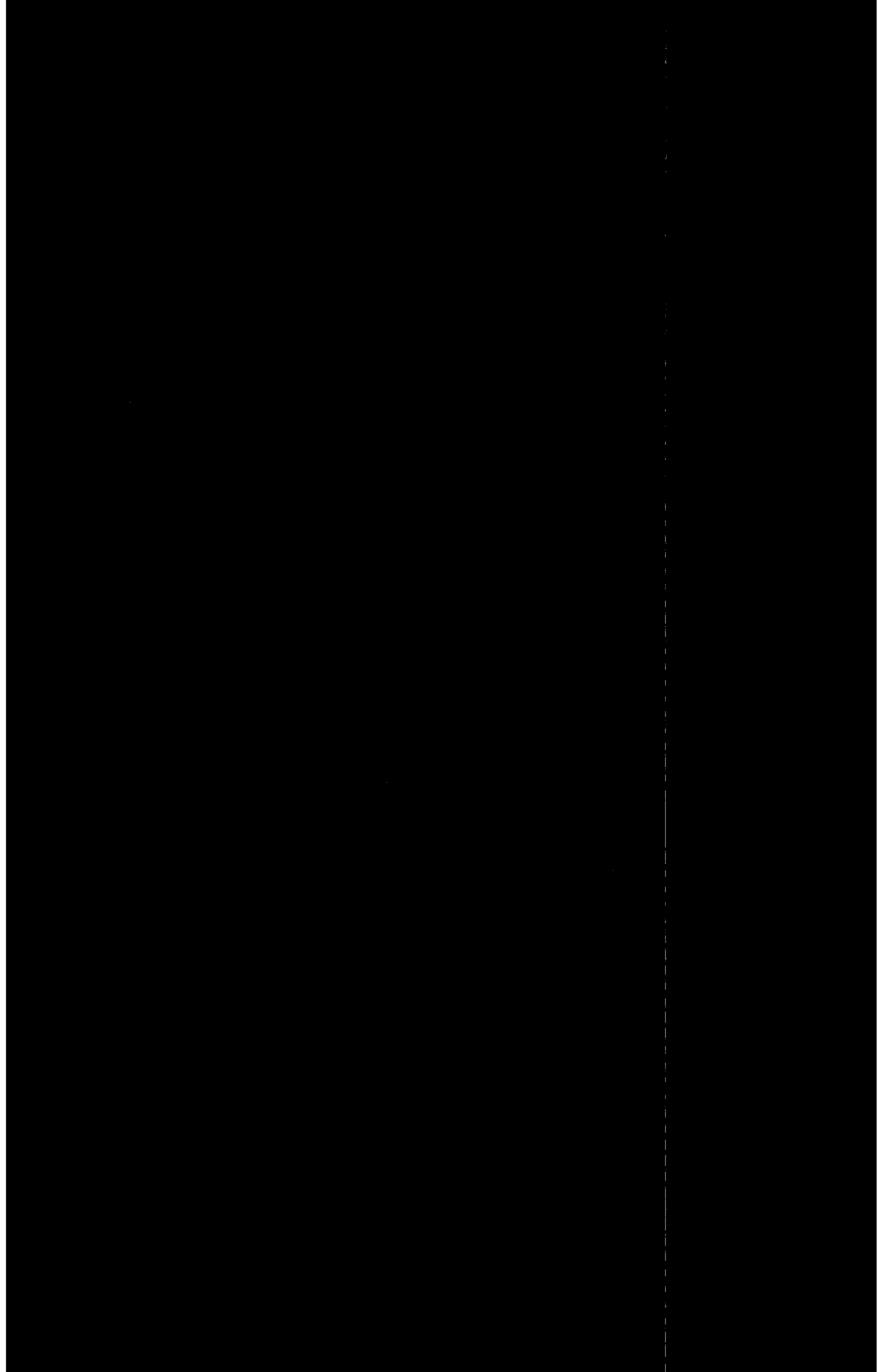

member mounted on a shaft extending through spaced lugs on said female member and a portion overlying one of said lugs and extending arcuately from said cam means to said common actuator, at least a portion of said extension also being journalled on said last-mentioned shaft.

4. In a separable coupling device, a tubular male member having a seating face on one end thereof and an annular groove on the exterior thereof adjacent to said end, said end having an external beveled surface formed thereon between it and said groove, a female member including a tubular portion having an interior shoulder, a gasket on said shoulder adapted to be engaged by said seating face, oppositely disposed cam means on said female member, said cams being adapted to engage said annular groove and force said seating face into tensional engagement with said gasket, individual lever means on said cam means extending toward each other, a common actuator on said female member operatively connected to lever means for moving said cams in unison, and spring means urging said common actuator and, consequently, said cams in a direction to supply the force to said cams for effecting said tensional engagement.

5. In a separable coupling device, a tubular male member having a seating face on one end thereof and an annular groove on the exterior thereof adjacent to said end, an external beveled surface formed on said member between said groove and said end, a female member including a tubular portion having an interior shoulder, a gasket on said shoulder adapted to be engaged by said seating face, oppositely disposed cams on said female member, said cams being so formed that when engaged by the end of said male member, they are cammed to positions providing a path for said male member to traverse the tubular portion of said female member, said cams being adapted thereafter to engage said annular groove and force said seating face into tensional engagement with said gasket, curved lever extensions on each of said cam means extending toward each other, a common actuator operatively connected to both said extensions for moving said cam means in unison, and spring means urging said actuator to effect the moving of said cam means in a direction to force said seating face into said tensional engagement.

6. In a separable coupling device, a tubular insertable member having a seating face on one end thereof and an external bevel terminating at said end, a socket member including a tubular portion having an internal shoulder, a gasket on said shoulder adapted to be engaged by said seating face, a pair of cam members pivotally carried on and extending into said scoket member and adapted to be engaged and displaced by said end of said plug member when the latter is inserted, to provide a path therein for said seating face to traverse as it is moved toward said gasket, an annular groove on said plug member adapted to be engaged by said cams and forced into tensional engagement with said gasket, arcuate extensions on said cams, a common actuator cooperating with said extensions, and spring means on said common actuator urging said actuator and said cams in a direction to effect and maintain said tensional engagement.

7. In a separable coupling device, a tubular male member having a seating face on one end thereof and an annular groove on the exterior thereof adjacent to said end, said member having an external bevel formed thereon between said annular groove and said end, a female member including a tubular portion having an interior shoulder, a gasket on said shoulder adapted to be engaged by said seating face, oppositely disposed cams on said female member, said cams being adapted to be displaced by said beveled surface to provide a clear path for said male member when the latter is inserted, said cams being adapted to thereafter engage said annular groove and force said seating face into tensional engagement with said gasket, curved extension levers on said cams, extending toward each other, a common actuator positioned on said female member and spaced apart substantially equidistant from both said cams, a passage in said actuator engaging the extremities of both of said extensions, spring means urging said actuator in a direction to cause said cams to engage said annular groove when said coupling members are engaged, and handle means on said actuator by means of which the latter may be pulled against the urge of said spring means.

8. In a device of the character described, a tubular plug member having a seating face on one end thereof and an annular engageable portion adjacent to said face with the beveled surface therebetween, a tubular socket member having an internal shoulder, a gasket on said shoulder adapted to be engaged by said face, oppositely disposed cams journaled on shafts mounted in the wall of said socket member and extending into the interior thereof said cams having lobe surfaces so arranged that when engaged by the end of said plug members they are cammed to positions providing a path for said plug to traverse and engage said gasket, curved handle extensions on said cams extending toward each other, a common actuator reciprocally movable on and parallel to the axis of said socket member equidistant from said cams, said actuator including a slotted passage into which the extremities of said extensions extend, and spring means on said common actuator urging the latter axially in a direction tending to urge said cams in a direction away from said shoulder, whereby said spring means effects the movement of said cams into engagement with said engageable portion and forces said plug member endwise into intimate contact with said gasket and in which a boss on said socket member has a bore formed therein parallel to the axis thereof in which said common actuator may reciprocate, and in which opposed slots are formed in said boss through which said extensions pass into said slotted passage.

JOHN T. KRAPP.

References Cited in the file of this patent
UNITED STATES PATENTS

| Number | Name | Date |
|---|---|---|
| 1,482,722 | Armstrong | Feb. 5, 1924 |
| 1,575,792 | Prellwitz | Mar. 9, 1926 |
| 2,493,521 | Bermingham | Jan. 3, 1950 |
| 2,525,037 | Krapp | Oct. 10, 1950 |
| 2,528,369 | Jensen | Oct. 31, 1950 |